(12) United States Patent
Xu et al.

(10) Patent No.: US 10,476,540 B2
(45) Date of Patent: *Nov. 12, 2019

(54) POLAR RECEIVER SYSTEM AND METHOD FOR BLUETOOTH COMMUNICATIONS

(71) Applicant: Innophase, Inc., San Diego, CA (US)

(72) Inventors: Yang Xu, San Diego, CA (US); Sara Munoz Hermoso, San Diego, CA (US)

(73) Assignee: Innophase, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,521

(22) Filed: Oct. 15, 2018

(65) Prior Publication Data

US 2019/0052295 A1    Feb. 14, 2019

Related U.S. Application Data

(63) Continuation of application No. 15/655,676, filed on Jul. 20, 2017, now Pat. No. 10,122,397.

(Continued)

(51) Int. Cl.
*H04B 1/16* (2006.01)
*H04J 1/02* (2006.01)
(Continued)

(52) U.S. Cl.
CPC .................. *H04B 1/16* (2013.01); *H04J 1/02* (2013.01); *H04L 27/06* (2013.01); *H04L 27/14* (2013.01);
(Continued)

(58) Field of Classification Search
CPC .......... H04B 1/16; H04W 4/80; H04W 4/008; H04J 1/02; H04L 27/06; H04L 27/14; H04L 27/22; H04L 27/38
See application file for complete search history.

(56) References Cited

U.S. PATENT DOCUMENTS

| 4,271,412 A | 6/1981 | Glass |
| 4,322,819 A | 3/1982 | Hyatt |

(Continued)

FOREIGN PATENT DOCUMENTS

| EP | 1187313 | 3/2002 |
| JP | 07221570 | 8/1995 |

(Continued)

OTHER PUBLICATIONS

Darvishi, Milad & Van der Zee, Ronan & Klumperink, Eric & Nauta, Bram. (2012). "A 0.3-to-1.2GHz tunable 4th-order switched gmC bandpass filter with >55dB ultimate rejection and out-of-band IIP3 of +29dBm". American Journal of Physics—Amer J Phys. 55. pp. 358-360 (3 pages) 10.1109/ISSCC.2012.6177050.

(Continued)

*Primary Examiner* — Janice N Tieu
(74) *Attorney, Agent, or Firm* — Invention Mine LLC

(57) ABSTRACT

Circuitry and methods are described for digital signal demodulation. In a configurable receiver, a method includes receiving a radio frequency signal at the configurable receiver, operating the configurable receiver in a first mode, the first mode including providing the radio frequency signal to an amplitude detection circuit to determine an amplitude, providing the radio frequency signal to a phase detection circuit to determine a phase, and providing the amplitude and phase to a coordinate rotation digital computer (CORDIC) logic circuit, and operating the configurable receiver in a low power mode upon receiving an indication to selectively disable the amplitude detection circuit, the low power mode including providing the radio frequency signal to the phase detection circuit to determine the phase, and providing the phase and a predetermined constant value in lieu of the amplitude to the CORDIC logic circuit.

26 Claims, 6 Drawing Sheets

Related U.S. Application Data

(60) Provisional application No. 62/477,999, filed on Mar. 28, 2017.

(51) Int. Cl.
*H04L 27/06* (2006.01)
*H04L 27/22* (2006.01)
*H04L 27/14* (2006.01)
*H04L 27/38* (2006.01)
*H04W 4/80* (2018.01)
*H04L 27/233* (2006.01)
*H04B 14/00* (2006.01)
*H04L 27/00* (2006.01)

(52) U.S. Cl.
CPC ............ *H04L 27/22* (2013.01); *H04L 27/233* (2013.01); *H04L 27/38* (2013.01); *H04L 27/3845* (2013.01); *H04W 4/80* (2018.02); *H04B 14/008* (2013.01); *H04L 27/00* (2013.01); *Y02D 70/00* (2018.01); *Y02D 70/10* (2018.01); *Y02D 70/14* (2018.01); *Y02D 70/144* (2018.01); *Y02D 70/40* (2018.01)

(56) References Cited

U.S. PATENT DOCUMENTS

| | | | |
|---|---|---|---|
| 5,325,095 | A | 6/1994 | Vadnais |
| 5,493,581 | A | 2/1996 | Young |
| 5,635,864 | A | 6/1997 | Jones |
| 6,161,420 | A | 12/2000 | Dilger |
| 6,369,659 | B1 | 4/2002 | Delzer |
| 6,373,337 | B1 | 4/2002 | Ganser |
| 6,556,636 | B1 | 4/2003 | Takagi |
| 6,587,187 | B2 | 7/2003 | Watanabe |
| 6,975,165 | B2 | 12/2005 | LopezVillegas |
| 7,042,958 | B2 | 5/2006 | Biedka |
| 7,095,274 | B2 | 8/2006 | LopezVillegas |
| 7,332,973 | B2 | 2/2008 | Lee |
| 7,400,203 | B2 | 7/2008 | Ojo |
| 7,447,272 | B2 | 11/2008 | Haglan |
| 7,564,929 | B2 | 7/2009 | LopezVillegas |
| 7,602,244 | B1 | 10/2009 | Holmes |
| 7,773,713 | B2 | 8/2010 | Cafaro |
| 7,888,973 | B1 | 2/2011 | Rezzi |
| 8,314,653 | B1 | 11/2012 | Granger-Jones |
| 8,368,477 | B2 | 2/2013 | Moon |
| 8,421,661 | B1 | 4/2013 | Jee |
| 8,498,601 | B2 | 7/2013 | Horng |
| 8,666,325 | B2 | 3/2014 | Shute |
| 8,804,875 | B1 | 8/2014 | Xu |
| 8,854,091 | B2 | 10/2014 | Hossain |
| 8,941,441 | B2 | 1/2015 | Testi |
| 9,083,588 | B1 | 7/2015 | Xu |
| 9,178,691 | B2 | 11/2015 | Shimizu |
| 9,240,914 | B2 | 1/2016 | Yao |
| 9,497,055 | B2 | 11/2016 | Xu |
| 9,673,828 | B1 * | 6/2017 | Xu ........................ H04L 27/22 |
| 9,673,829 | B1 | 6/2017 | Xu |
| 9,813,011 | B2 | 11/2017 | Despesse |
| 2001/0001616 | A1 | 5/2001 | Rakib |
| 2002/0132597 | A1 | 9/2002 | Peterzell |
| 2003/0053554 | A1 | 3/2003 | McCrokle |
| 2004/0036538 | A1 | 2/2004 | Devries |
| 2004/0100330 | A1 | 5/2004 | Chandler |
| 2005/0285541 | A1 | 12/2005 | LeChevalier |
| 2006/0145762 | A1 | 7/2006 | Leete |
| 2006/0193401 | A1 | 8/2006 | Lopez Villegas |
| 2006/0285541 | A1 | 12/2006 | Roy |
| 2007/0132511 | A1 | 6/2007 | Ryynanen |
| 2008/0079497 | A1 | 4/2008 | Fang |
| 2008/0112526 | A1 | 5/2008 | Yi |
| 2008/0150645 | A1 | 6/2008 | McCorquodale |
| 2008/0192872 | A1 | 8/2008 | Lindoff |
| 2008/0192877 | A1 | 8/2008 | Eliezer |
| 2008/0205709 | A1 | 8/2008 | Masuda |
| 2008/0211576 | A1 * | 9/2008 | Moffatt ................. H03F 1/3247 330/149 |
| 2008/0220735 | A1 | 9/2008 | Kim |
| 2008/0225981 | A1 | 9/2008 | Reddy |
| 2008/0225984 | A1 * | 9/2008 | Ahmed ..................... H03C 5/00 375/302 |
| 2008/0291064 | A1 | 11/2008 | Johansson |
| 2009/0153244 | A1 | 6/2009 | Cabanillas |
| 2011/0003571 | A1 | 1/2011 | Park |
| 2011/0019657 | A1 | 1/2011 | Zaher |
| 2011/0050296 | A1 | 3/2011 | Fagg |
| 2011/0159877 | A1 | 6/2011 | Kenington |
| 2011/0260790 | A1 | 10/2011 | Haddad |
| 2011/0298557 | A1 | 12/2011 | Kobayashi |
| 2011/0299632 | A1 | 12/2011 | Mirzaei |
| 2011/0300885 | A1 | 12/2011 | Darabi |
| 2012/0074990 | A1 | 3/2012 | Sornin |
| 2012/0256693 | A1 | 10/2012 | Raghunathan |
| 2012/0306547 | A1 | 12/2012 | Arora |
| 2013/0143509 | A1 | 6/2013 | Horng |
| 2013/0257494 | A1 | 10/2013 | Nikaeen |
| 2014/0023163 | A1 | 1/2014 | Xu |
| 2014/0133528 | A1 | 5/2014 | Noest |
| 2014/0185723 | A1 | 7/2014 | Belitzer |
| 2014/0269999 | A1 | 9/2014 | Cui |
| 2015/0180685 | A1 | 6/2015 | Noest |
| 2015/0207499 | A1 | 7/2015 | Horng |
| 2016/0155558 | A1 | 6/2016 | Groves |
| 2017/0085405 | A1 | 3/2017 | Xu |
| 2017/0163272 | A1 | 6/2017 | Xu |

FOREIGN PATENT DOCUMENTS

| | | |
|---|---|---|
| JP | 11088064 | 3/1999 |
| WO | 2005078921 A2 | 8/2005 |
| WO | 2005078921 A3 | 4/2006 |
| WO | 2012132847 | 4/2012 |

OTHER PUBLICATIONS

Cheng, Jiao et al. "9.6 A 1.3mW 0.6V WBAN-compatible sub-sampling PSK receiver in 65nm CMOS," 2014 IEEE International Solid-State Circuits Conference Digest of Technical Papers (ISSCC) (2014): pp. 168-169 (3 pages).

Robert F. Wiser, Masoud Zargari, David K. Su, Bruce A. Wooley, "A 5-GHz Wireless LAN Transmitter with Integrated Tunable High-Q RF Filter", Solid-State Circuits IEEE Journal of, vol. 44, No. 8, pp. 2114-2125 (12 pages), 2009.

He, Xin & B. Kuhn, William. (2005). A 2.5-GHz low-power, high dynamic range, self-tuned Q-enhanced LC filter in SOI. Solid-State Circuits, IEEE Journal of. 40. 1618-1628 (11 pages) 10.1109/JSSC. 2005.852043.

D. Li and Y. Tsividis, Design techniques for automatically tuned integrated gigahertz-range active LC filters, IEEE Journal of Solid-State Circuits, vol. 37, No. 8, pp. 967-977 (11 pages), Aug. 2002.

Testi, Nicolo et al. "A 2.4GHz 72dB-variable-gain 100dB-DR 7.8mW 4th-order tunable Q-enhanced LC band-pass filter" 2015 IEEE Radio Frequency Integrated Circuits Symposium (RFIC) (2015): 87-90 (4 pages).

Chi-Tsan Chen et al., Wireless Polar Receiver Using Two Injection-Locked Oscillator Stages for Green Radios, IEEE MTT-S International, Jun. 2011. (4 pages).

International Search Report and Written Opinion for PCT/US2014/030525 dated Jul. 24, 2014. (16 pages).

Jose Maria Lopez-Villegas et al., BPSK to ASK Signal Conversion Using Injection-Locked Oscillators-Part I: Theory, Dec. 2005, IEEE Transactions on Microwave Theory and Techniques, vol. 53, No. 12, pp. 3757-3766 (10 pages).

N. Siripon, et al., Novel Sub-Harmonic Injection-Locked Balanced Oscillator, Microwave and Systems Research Group (MSRG), School of Electronics, Computing and Mathematics, University of Surrey, Sep. 24, 2011, 31st European Microwave Conference. (4 pages).

(56) References Cited

OTHER PUBLICATIONS

Rategh, H.R. & Lee, T.H.. (1998), "Superharmonic injection locked oscillators as low power frequency dividers", 132-135. 10.1109/VLSIC.1998.688031. (4 pages).

Behzad Razavi, "A Study of Injection Pulling and Locking in Oscillators", Electrical Engineering Department, University of California, 2003, IEEE, Custom Integrated Circuits Conference. pp. 305-312 (8 pages).

Marc Tiebout, "A 50GHz Direct Injection Locked Oscillator Topology as Low Power Frequency Divider in 0.13 µm CMOS", Infineon Technologies AG, Solid-State Circuits Conference, 2003, pp. 73-76, 29th European ESSCIRC. (4 pages).

Pei-Kang Tsai, et al., "Wideband Injection-Locked Divide-by-3 Frequency Divider Design with Regenerative Second-Harmonic Feedback Technique", RF@CAD Laboratory, Department of Electrical Engineering, National Cheng Kung University, Tainan, Taiwan. Mar. 21, 2013 (4 pages).

He, Xin and Kuhn, William B. "A Fully Integrated Q-enchanced LC Filter with 6dB Noise Figure at 2.5 GHz in SOI" 2004 IEEE Radio Frequency Integrated Circuits Symposium (4 pages).

Aeroflex, Application Note, Measurement of Frequency Stability and Phase Noise, Feb. 2007, part No. 46891/865.

Behzad Razavi, A Study of Injection Pulling and Locking in Oscillators, Electrical Engineering Department, University of California, 2003, IEEE, Custom Integrated Circuits Conference.

Chi-Tsan Chen et al., Wireless Polar Receiver Using Two Injection-Locked Oscillator Stages for Green Radios, IEEE MTT-S International, Jun. 2011.

Chi-Tsan Chen, Cognitive Polar Receiver Using Two Injection-Locked Oscillator Stages, IEEE Transactions on Microwave Theory and Techniques, vol. 59, No. 12, Dec. 2011.

Claude Frantz, Frequency Discriminator, published 1994.

Dudek, et al., "A High-Resolution CMOS Time-to-Digital Converter Utilizing a Vernier Delay Line", IEEE Transactions on Solid-State Circuits, vol. 35, No. 2, Feb. 2000.

Effendrik, P., "Time-to-Digital Converter (TDC) for WiMAX ADPLL in State-of-The-Art 40-nm CMOS", MSc Thesis, Apr. 18, 2011, 80 pages.

Electronic Warfare and Radar Systems Engineering Handbook, Mixers and Frequency Discriminators, Section 6-8.1 to 6-8.2, Apr. 1, 1999, Naval Air Systems Command and Naval Air Warfare Center, USA.

Henzler, S., "Time-to_Digital Converters", Springer Series in Advanced Microelectronics 29, DOI, 10.1007/978-90-481-8628-0_2, copyright Springer Science+Business Media B.V. 2010, Chapter 2, pp. 15 pages.

Hewlett Packard, Phase Noise Characterization of Microwave Oscillators, Frequency Discriminator Method, Sep. 1985, USA.

International Search Report and Written Opinion for PCT/US2014/026459 dated Jul. 28, 2014.

International Search Report and Written Opinion for PCT/US2014/029055 dated Sep. 15, 2014.

International Search Report and Written Opinion for PCT/US2014/030525 dated Jul. 24, 2014.

International Search Report for PCT/US2013/024159 dated Apr. 9, 2013.

Jose Maria Lopez-Villegas et al., BPSK to ASK Signal Conversion Using Injection-Locked Oscillators-Part I: Theory, Dec. 2005, IEEE Transactions on Microwave Theory and Techniques, vol. 53, No. 12, available online at: http://diposit.ub.edu/dspace/bitstream/2445/8751/1/529612.pdf.

Jovanovic, et al., "Vernier's Delay Line Time-to-Digital Converter", Scientific Publications of the State University of Novi Pazar, Ser. A: Appl. Math. Inform. and Mech., vol. 1, 1 (2009), pp. 11-20.

Lin, et al., "Single-Stage Vernier Time-to-Digital Converter with Sub-Gate Delay Time Resolution", Circuits and Systems, 2011, 2, 365-371, Oct. 2011.

Marc Tiebout, A 50GHz Direct Injection Locked Oscillator Topology as Low Power Frequency Divider in 0.13 µ m CMOS, Infineon Technologies AG, Solid-State Circuits Conference, 2003, pp. 73-76, 29th European ESSCIRC.

N. Siripon, et al., Novel Sub-Harmonic Injection-Locked Balanced Oscillator, Microwave and Systems Research Group (MSRG), School of Electronics, Computing and Mathematics, University of Surrey, Sep. 24, 2011, 31st European Microwave Conference.

Nazari, et al., "Polar Quantizer for Wireless Receivers: Theory, Analysis, and CMOS Implementation", IEEE Transactions on Cricuits and Systems, vol. 61, No. 3, Mar. 2014.

Putnam, William, and Julius Smith, "Design of fractional delay filters using convex optimization" (1997 IEEE ASSP Workshop on Applications of Signal Processing to Audio and Acoustics).

Notification of Transmittal of the International Search Report and The Written Opinion of the International Searching Authority, or The Declaration, for PCT/US16/53484, dated Dec. 19, 2016, 8 pages.

Notification of Transmittal of The International Search Report and The Written Opinion of the International Search Authority, or the Declaration, for PCT/US16/64772 dated Feb. 28, 2017, 7 pages.

Jianjun Yu and Fa Foster Dai, "A 3-Dimensional Vernier Ring Time-to-digital Converter in 0.13µm CMOS", Electrical and Computer Engineering, Auburn University, Auburn, AL 36849, USA, Sep. 19, 2010.

Antonio Liscidini, Luca Vercesi, and Rinaldo Castello, "Time to Digital Converter based on a 2-dimensions Vernier architecture", University of Pavia Via Ferrata 1, 27100 Pavia, Italy; Sep. 13, 2009.

William Putnam , Julius Smith, "Design of Fractional Delay Filters Using Convex Optimization", Department of Electrical Engineering and, Center for Research in Music and Acoustics (CCRMA), Stanford University, Stanford, CA 94305-8180; Oct. 1997.

William Putnam, Julius Smith, "Design of Fractional Delay Filters Using Convex Optimization", Department of Electrical Engineering and Center for Research in Music and Acoustics (CCRMA) Stanford University Stanford, CA 94305-8180. Published in IEEE: workshop on applications of signal processing to audio and acoustics; Oct. 1997.

Dongyi Liao, et al., "An 802.11a/b/g/n Digital Fractional-N PLL With Automatic TDC Linearity Calibration for Spur Cancellation", IEEE Journal of Solid-State Circuits, 0018-9200 © 2017 IEEE.; Jan. 16, 2017.

Renaldi Winoto, et al. "A 2×2 WLAN and Bluetooth Combo SoC in 28nm CMOS with On-Chip WLAN Digital Power Amplifier, Integrated 2G/BT SP3T Switch and BT Pulling Cancelation", ISSCC 2016 / Session 9 / High-Performance Wireless / 9.4, 2016 IEEE International Solid-State Circuits Conference; Feb. 2, 2016.

Stefano Pellerano, at al. "A 4.75-GHz Fractional Frequency Divider-by-1.25 With TDC-Based All-Digital Spur Calibration in 45-nm CMOS", 3422 IEEE Journal of Solid-State Circuits, vol. 44, No. 12, December 2009.

Hamid R. Rategh, et al., Superharmonic Injection Locked Oscillators as Low Power Frequency Dividers, Stanford University, Stanford, California, IEEE Jun. 13, 1998.

Pei-Kang Tsai, et al., Wideband Injection-Locked Divide-by-3 Frequency Divider Design with Regenerative Second-Harmonic Feedback Technique, RF@CAD Laboratory, Department of Electrical Engineering, National Cheng Kung University, Tainan, Taiwan 2009.

Paul O'Brien, et al.; Analog Devices Raheen Business Park Limerick Ireland paul-p.. "A Comparison of Two Delay Line Discriminator Implementations for Low Cost Phase Noise Measurement." (2010).

Ahmad Mirzaei, et al, Multi-Phase Injection Widens Lock Range of Ring-Oscillator-Based Frequency Dividers, IEEE Journal of Solid-State Circuits, vol. 43, No. 3, Mar. 2008.

Jun-Chau Chien, et al, Analysis and Design of Wideband Injection-Locked Ring Oscillators With Multiple-Input Injection, EEE Journal of Solid-State Circuits, vol. 42, No. 9, Sep. 2007.

International Search report and Written Opinion for PCT/US18/27222 dated Jun. 28, 2018.

Notification of Transmittal of The International Preliminary Report on Patentability and The Written Opinion of the International Search

(56) References Cited

OTHER PUBLICATIONS

Authority, or the Declaration, for PCT/US16/64772 dated Jun. 14, 2018, Written Opinion dated Feb. 28, 2017, 7 pages.
Rafael Betancourt-Zamora, et al; "1-GHz and 2.8-GHz CMOS injection-locked ring oscillator prescalers"; Allen Center for Integrated Systems, Stanford University; Conference Paper—Feb. 2001.
Notification of Transmittal of the International Search Report and the Written Opinion of the International Searching Authority, or the declaration for PCT/US2013/024159 dated Apr. 9, 2013.
Ross, Andrew; "Power Save Issues in WLAN"; Silex Technology America, Inc.; 2014; (35 pages).

* cited by examiner

POLAR RECEIVER SYSTEM AND METHOD FOR BLUETOOTH COMMUNICATIONS

CROSS REFERENCE TO RELATED APPLICATIONS

This application is a Continuation of U.S. application Ser. No. 15/655,676 filed Jul. 20, 2017, entitled "POLAR RECEIVER SYSTEM AND METHOD FOR BLUETOOTH COMMUNICATIONS", which claims benefit of U.S. Provisional Application No. 62/477,999, filed Mar. 28, 2017, entitled "POLAR RECEIVER SYSTEM AND METHOD FOR BLUETOOTH COMMUNICATIONS", all of which are hereby incorporated by reference in their entirety.

BACKGROUND

Communication transceivers may utilize numerous architectures to recover data from a modulated carrier signal. These architectures include coherent demodulation, using either intermediate frequency conversion or direct-conversion receivers. Such receivers typically recover or regenerate the communications carrier signal using a phase-locked loop (PLL) and coherent demodulation. Recently, polar receiver architectures have been proposed that extract the modulation phase components from a received modulation signal without using a carrier recovery circuitry. The previously proposed polar receiver architectures and associated signal processing have deficiencies that result in poor performance and high bit error rates (BER). Accordingly, there is a need for improved polar receiver signal processing and architectures.

SUMMARY

In an exemplary embodiment, disclosed herein is a configurable receiver operable to receive a modulated radio-frequency input signal. In one embodiment, the configurable receiver includes a frequency division circuit to receive a radio frequency signal and generate a frequency-divided output signal: a time-to-digital converter coupled to the frequency division circuit to identify a period of the frequency-divided output signal: a digital subtractor coupled to the time-to-digital converter to generate an offset digital time signal, the offset digital time signal operable to identify a shift in phase of the frequency-divided output signal by identifying a temporary change in the period of the frequency-divided output signal: a digital integrator coupled to the digital subtractor to provide a value representing a phase of the radio frequency signal: an amplitude detection circuit coupled to the frequency division circuit, the amplitude detection circuit coupled to receive the radio frequency signal and generate the amplitude signal; and a mode control circuit coupled to the amplitude detection circuit and to an input of a coordinate rotation digital computer (CORDIC) logic circuit, the mode control circuit configured to receive an indication to selectively disable the amplitude detection circuit and to provide a predetermined constant value to the CORDIC logic circuit.

In a further embodiment, disclosed herein is a method including receiving a radio frequency signal at the configurable receiver, operating the configurable receiver in a first mode, the first mode including providing the radio frequency signal to an amplitude detection circuit to determine an amplitude, providing the radio frequency signal to a phase detection circuit to determine a phase, and providing the amplitude and phase to a coordinate rotation digital computer (CORDIC) logic circuit, and operating the configurable receiver in a low power mode upon receiving an indication to selectively disable the amplitude detection circuit, the low power mode including providing the radio frequency signal to the phase detection circuit to determine the phase, and providing the phase and a predetermined constant value in lieu of the amplitude to the CORDIC logic circuit.

Another embodiment provides for a system including a processing device, a memory coupled to the processing device; and a configurable receiver coupled to the processing device, the configurable receiver including a frequency division circuit to receive a radio frequency signal and generate a frequency-divided output signal, a time-to-digital converter coupled to the frequency division circuit to identify a period of the frequency-divided output signal, a digital subtractor coupled to the time-to-digital converter to generate an offset digital time signal, the offset digital time signal operable to identify a shift in phase of the frequency-divided output signal by identifying a temporary change in the period of the frequency-divided output signal, a digital integrator coupled to the digital subtractor to provide a value representing a phase of the radio frequency signal, an amplitude detection circuit coupled to the frequency division circuit, the amplitude detection circuit coupled to receive the radio frequency signal and generate the amplitude signal, and a mode control circuit coupled to the amplitude detection circuit and to an input of a coordinate rotation digital computer (CORDIC) logic circuit, the mode control circuit configured to receive an indication to selectively disable the amplitude detection circuit and to provide a predetermined constant value to the CORDIC logic circuit.

BRIEF DESCRIPTION OF THE DRAWINGS

The accompanying figures, wherein like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
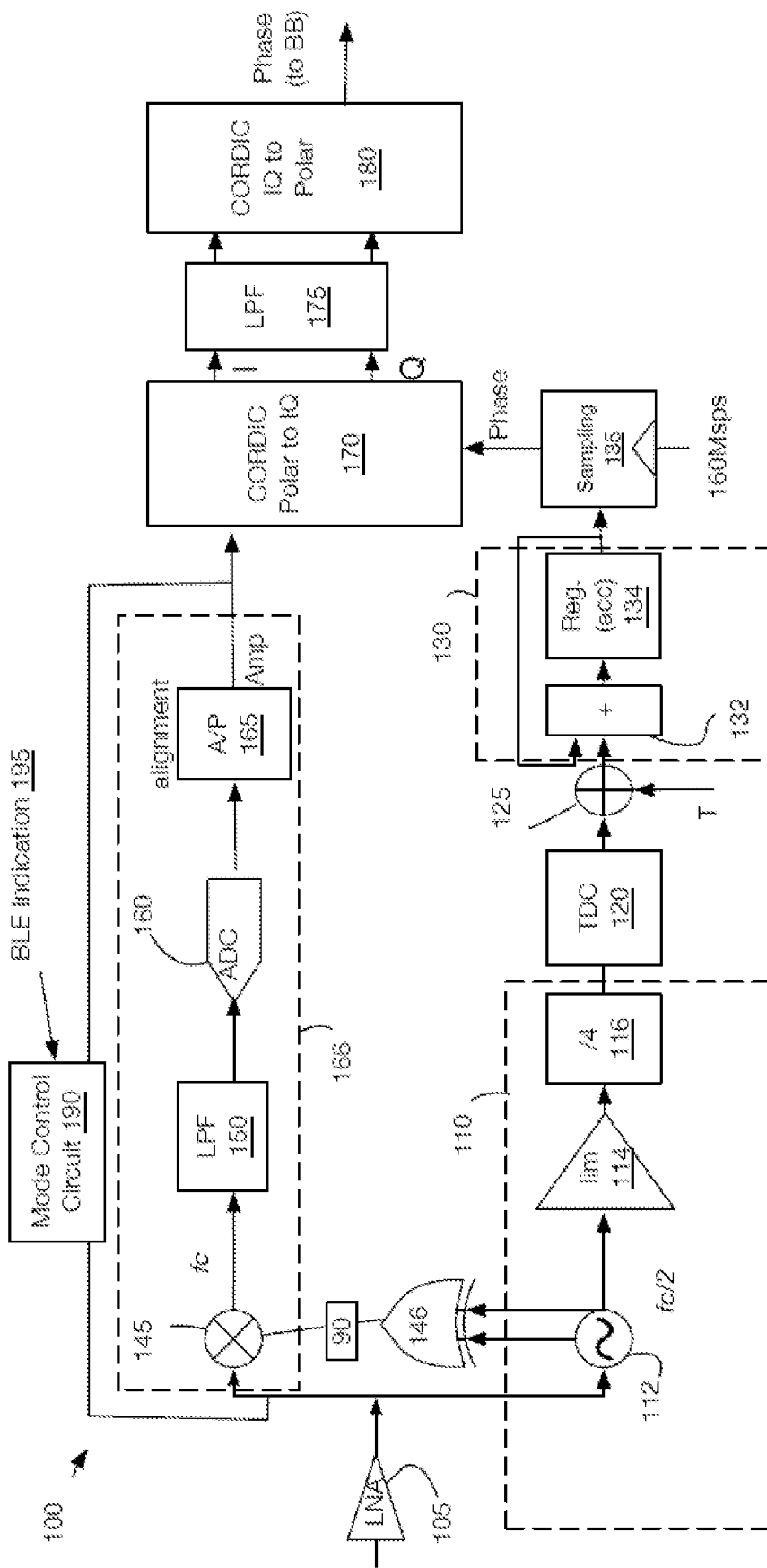
FIG. 1 is a block diagram of a configurable multi-mode receiver in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In one embodiment, the disclosure relates to a configurable multi-mode receiver system and method for modulated signal communications. In one embodiment, the disclosure relates to Bluetooth communications using constant envelope magnitude information and polar to rectangular (IQ) conversion and base band low pass filtering. Embodiments disclosed herein relate to Bluetooth low energy communications as well as other low energy communication specifications as will be appreciated by those of skill in the art.

In an exemplary embodiment, illustrated in FIG. 1, a configurable multi-mode receiver receives an incoming radio-frequency (RF) signal through an input node (not shown), such as an antenna. In some embodiments, the incoming radio-frequency signal, which can be implemented as a modulated carrier signal, has a frequency in the range of 2412 MHz-2484 MHz, although, as appreciated by one of skill in the art, the use of the configurable receiver 100 is not limited to that frequency range. The incoming radio-frequency signal may be filtered by a bandpass filter (not shown) and amplified by a low-noise amplifier (LNA) 105. The configurable receiver 100 operates to receive and decode frequency modulated or phase-modulated radio-frequency signals, such as signals modulated using phase shift keying (PSK) or quadrature amplitude modulation (QAM). As the term is used in the present disclosure, phase-modulated signals include signals that are modulated in phase (e.g., binary phase-shift keying, quadrature phase-shift keying, 8-PSK, or 16-PSK) as well as signals that are modulated in both phase and amplitude (e.g., 16-QAM, 64-QAM, or 256-QAM). Frequency modulated signals include, among others, frequency shift keying (FSK) signals such as binary frequency-shift keying (BFSK) signals, multiple frequency-shift keying (MFSK) signals, and minimum-shift keying (MSK) signals.

While some of the embodiments described herein refer to the demodulation of phase-modulated signals, it should be noted that the disclosed embodiments can also be used to demodulate frequency-modulated (FM) signals, based on the mathematical relationship between changes in frequency and changes in phase.

The configurable receiver 100 may be provided with frequency division circuitry 110. The frequency division circuitry has an input for receiving the modulated radio-frequency input signal from the low-noise amplifier 105 and a frequency-divided output for providing a frequency-divided output signal to a trigger input of a time-to-digital converter (TDC) 120. The frequency division circuitry operates to divide the frequency of the input signal by a frequency divisor. In some embodiments, the frequency division circuitry can be implemented using a harmonic injection-locked oscillator, a digital frequency divider, or a combination thereof, among other possibilities. In one embodiment, the frequency division circuitry 110 may comprise an injection-locked oscillator 112, an amplitude limiter 114, and a frequency divider 116 (having a divisor such as 4, 8, 16, etc.). Another embodiment of the frequency division circuitry is discussed below in relation to FIG. 2.

A time-to-digital converter 120 may operate to measure a characteristic time of the frequency-divided signal, such as the period of the frequency-divided signal. The time-to-digital converter 120 may operate to measure the period of the frequency-divided signal by measuring an elapsed time between successive corresponding features of the frequency-divided signal. For example, the time-to-digital converter may measure the period of the frequency-divided signal by measuring a time between successive rising edges of the frequency-divided signal or the time between successive falling edges of the frequency-divided signal. In alternative embodiments, the time-to-digital converter may measure a characteristic time other than a complete period, such as an elapsed time between a rising edge and a falling edge of the frequency-divided signal. In a further embodiment, the TDC may measure features (i.e., rising edges, or falling edges) of the modulated signal with respect to an internal reference clock. In this manner, the phase measurement of the received signal may be made with respect to the internal timing signal. Frequency offsets between the received modulated signal (after frequency division, when present) may be accounted for by repeatedly removing a time increment equal to predetermined difference in period between the internal reference and the received modulated signal.

In some embodiments, the time-to-digital converter 120 operates without the use of an external trigger such as a clock signal. That is, the time-to-digital converter 120 measures the time between two features (e.g., two rising edges) of the frequency-divided signal rather than the time between an external trigger signal and a rising edge of the frequency-divided signal. Because the start and end of the time period measured by the time-to-digital converter 120 are both triggered by the frequency-divided signal, rather than an external clock signal, the time-to-digital converter 120, is referred to herein as a self-triggered time-to-digital converter.

In the example of FIG. 1, the self-triggered time-to-digital converter 120 may provide a digital time output that represents the period of the frequency-divided output signal. The digital time output may be provided to a digital subtractor 125. The digital subtractor 125 operates to subtract a period offset value T from the digital time output, thereby generating an offset digital time output signal. The period offset value may be a constant value corresponding to an expected period of the frequency-divided signal in an unmodulated state, which may be expressed in native units used by the time-to-digital converter. For example, where the frequency of the frequency-divided signal is expressed by $f_d$, the period offset value T can be expressed by $$T = \frac{1}{f_d \cdot LSB}$$

where LSB is the amount of time represented by the least significant bit of the time-to-digital converter. The offset digital time output is thus at or near zero when no shift is occurring in the phase of the frequency-divided signal.

When a phase shift does occur in the modulated radio-frequency signal (such as in a phase-modulated or frequency modulated carrier signal) this results in a temporary change in the period of the modulated radio-frequency signal, which in turn causes a temporary change in the period of the frequency-divided signal. This temporary change in the period of the frequency-divided signal is measured as a temporary change in the digital time output (and in the offset digital time output). In some embodiments, the offset digital time output is at or near zero during periods when the phase of the modulated radio-frequency signal remains steady, while a shift in the phase of the modulated radio-frequency signal results in the offset digital time output signal briefly taking on a positive or negative value, depending on the direction of the phase shift.

The offset digital time output signal is provided to a digital integrator 130, which may be implemented in configurable receiver 100 using a digital adder 132 and a register 134. In other embodiments, alternative implementations of the digital integrator may be used. The digital integrator generates an integrated time signal. The register 134 may be clocked using the frequency-divided signal, resulting in one addition per cycle of the frequency-divided signal. In embodiments in which the offset digital time output signal represents a change in the phase of the modulated radio-frequency signal, the integrated time signal provides a value that represents the current phase of the modulated radio-frequency signal.

In configurable receiver 100, the integrated time signal may be sampled using a register 135, which may be clocked by a clock source (not shown). In some embodiments, the register 135 operates to sample the integrated time signal at 160 Msps, although other sampling rates may alternatively be used.

In the case of Bluetooth Low Energy (BLE) signals, the requirements of the BLE specification may be met without the need to process the amplitude of the modulated signal, due to the constant envelope nature of the signals.

In some embodiments, configurable receiver 100 may further comprise an amplitude path. Elements of the amplitude path form amplitude detection circuit 166 including at least mixer 145, low pass filter 150, analog-to-digital circuit 160 and alignment logic 165. In one embodiment, amplitude detection circuit may be implemented as an envelope detector, operating to provide a signal representing the amplitude of the modulated radio-frequency signal. The envelope detector may operate using various techniques such as, for example, signal rectification followed by low-pass filtering. In one embodiment, the amplitude path may include mixer 145 and low pass filter 150. In one embodiment, mixer 145 receives the output of LNA 105 and the output of XOR 146, which is coupled to oscillator 112 and generates a frequency, such as a carrier frequency. The signal representing the amplitude of the modulated radio-frequency signal may be converted to a digital form with an analog-to-digital converter (ADC) 160. In some embodiments, ADC 160 samples the amplitude of the modulated radio-frequency signal at 160 Msps.

In some embodiments, an alignment logic 165 may be provided to provide temporal alignment between the amplitude signal from ADC 160 and the phase signal from register 135, accommodating different processing delays in the generation of the amplitude signal versus the phase signal.

In one embodiment, the aligned amplitude and phase signals may be provided to coordinate rotation digital computer (CORDIC) logic circuit 170. The CORDIC logic 170 is operative to identify in-phase (I) and quadrature (Q) components corresponding to a phase-modulated radio-frequency input signal. In some embodiments, the identified I and Q components may be processed and/or analyzed to demodulate the received signal, as known to those of skill in the art.

In one embodiment, the configurable receiver 100 may operate on a constant envelope modulated signal, such as a Bluetooth low energy (BLE) signal. In such cases, the configurable receiver 100 may operate in a reduced power mode (further discussed in relation to FIG. 3). In such a reduced power mode, the amplitude path of the signal may be disabled, and rather than a received and processed amplitude signal, a constant amplitude value (such as a constant amplitude of 1) may be input to the CORDIC logic 170 to process the phase signal. For example, in one embodiment, configurable receiver 100 includes mode control circuit 190 at least coupled to the input of CORDIC 170 and, in one embodiment, coupled to the input of configurable receiver 100, such as at the input or output of LNA 105 to control the mode of operation for configurable receiver 100. If a BLE indication 195 is received at mode control circuit 190, a low power mode can be implemented by turning off the amplitude path and injecting a constant "1" to CORDIC 170 as representative of the amplitude signal. If there is no BLE indication, the amplitude signal provided to CORDIC 170 could default to the amplitude signal generated by the amplitude detection circuit 166.

According to an example, a configurable receiver in a low power mode as a function of a determination that a received radio frequency signal is a constant envelope modulated signal.

According to an example, a mode control circuit in a configurable receiver may receive an indication to selectively disable an amplitude detection circuit as a function of a determination that a received radio frequency signal is a constant envelope modulated signal.

The identified in-phase and quadrature components may then pass through a low pass filter (LPF) 175, which may be operative to remove spurious signal information (such as an interfering signal). The filtered I and Q components may then be passed through another CORDIC logic 180, which may be operative to convert the I and Q components back to phase and amplitude signals. With appropriate settings of the LPF 175, the filtered and reconverted phase signal out of CORDIC 180 may be cleaned of spurious signal information (such as a jamming signal, signals on nearby frequencies, etc.). In these cases, the amplitude signal may be discarded, as all useful information is contained in the phase.

In some embodiments, the filtered and reconverted phase signal may be used in turn to identify a particular symbol conveyed by the phase-modulated radio-frequency input signal. In one embodiment, the signal may be demodulated from the phase processed signal directly, without the need to convert to I and Q components.

In one embodiment, identification may be by such as a quadrature amplitude modulation (QAM) symbol (after passing through another CORDIC), using conventional techniques known to those skilled in the art.

Due to the GFSK signals being constant envelope, the system can process the input signal without operating an amplitude path with no performance degradation in the case of no interference, as the CORDIC algorithm would be a one-dimensional search instead of a two-dimension.

Variations on the specific configurable multi-mode receiver 100 illustrated in FIG. 1 can also be implemented. For example, instead of being connected between the digital integrator and the digital subtractor, the digital divider 116 may be positioned after the time-to-digital converter 120 in some embodiments, reflecting the distributive property of multiplication.

Figure 2:
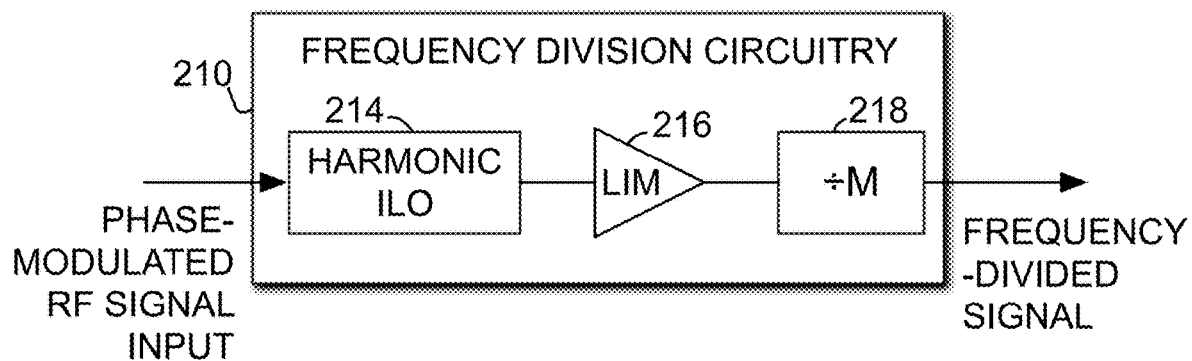
FIG. 2 is a block diagram of frequency division circuitry employed in some embodiments of a configurable receiver.

Although the frequency division circuitry 110 may be implemented in a variety of different ways, one exemplary structure is illustrated in FIG. 2. In the frequency division circuitry 210 of FIG. 2, a modulated radio frequency signal is provided as an input to a harmonic injection locked oscillator (ILO) 214 operating as an injection-locked frequency divider. The harmonic ILO 214 oscillates at a frequency that is a subharmonic of the modulated radio frequency signal. In some embodiments, the harmonic ILO 214 oscillates at a frequency that is one half the frequency of the modulated radio frequency input signal. The harmonic ILO operates to divide the frequency of the modulated radio frequency signal by a divisor N.

The frequency division circuitry 110 may further include a buffer 216 operating as an amplitude limiter. The limiter 216 converts a generally sinusoidal input from the harmonic ILO 214 into a generally square-wave like output that is more amenable to subsequent digital processing. The square-wave like output of the limiter 216 is then provided to a digital frequency divider 218, which may be implemented using one or more D flip-flops or using other known frequency division circuitry. The digital frequency divider 218 divides the output of the limiter 216 by a divisor M to generate the frequency-divided signal that is ultimately fed to the self-triggered time-to-digital converter. The divisor M may be, for example 4. Other values may be used depending on the frequency of the modulated carrier as well as the bandwidth/speed capabilities of the time-to-digital converter. The value of the divisor may be selected in view of the carrier frequency to permit use of a power-efficient time-to-digital converter. For example, a divisor of 4 can be used with a carrier frequency of 2.4 GHz, while a divisor of 128 can be used with a carrier frequency of 60 GHz.

In further examples, the value of the divisor may be 8 or 16, or in further embodiments still larger divisors (e.g., 32, 64, etc.). In some embodiments, utilizing a higher value of the divisor may permit the logic after the TDC to operate at a lower frequency, thereby reducing power consumption.

In the case of BLE, it is also possible to reduce the requirements on certain aspects of the receiver circuit to save further power. For example, the ILO phase noise may be relaxed. Also, the LNA gain may have relaxed requirements, also saving power.

It should be understood that variations on the architecture illustrated in FIG. 2 may also be employed. For example, frequency division circuitry can be implemented without the use of harmonic ILO 214 or without the use of a digital frequency divider 218. However, the use of a harmonic ILO 214 provides a high amount of gain while substantially reducing the effects of amplitude modulation that might otherwise interfere with processing of the phase signal. The output of the harmonic ILO 214 provides a faithful representation of the input phase, the output phase being representable as a linear transfer function of the input phase.

Figure 3:
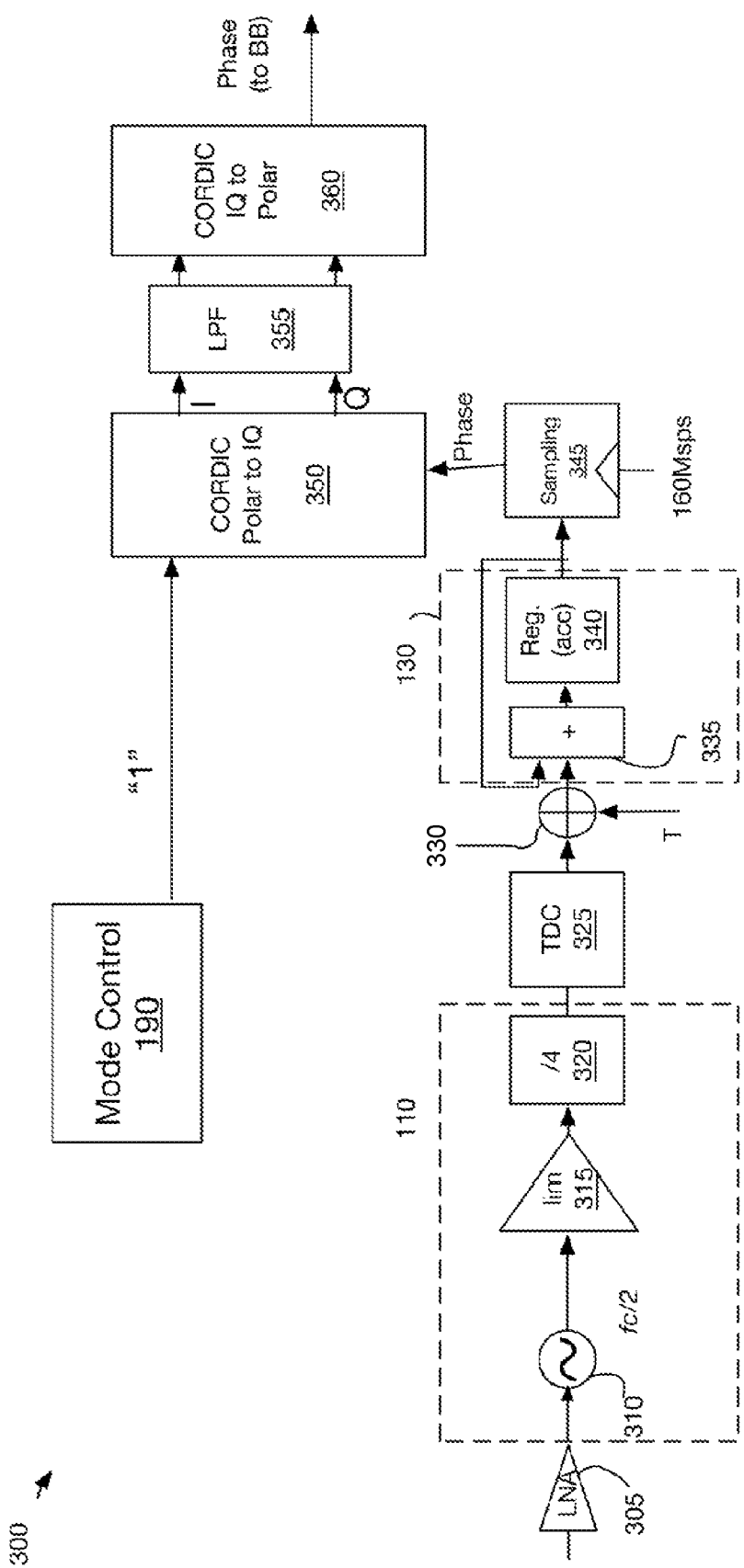
FIG. 3 is a functional block diagram of a second mode of the configurable receiver of FIG. 1.

An exemplary embodiment of a second mode 300 of the configurable receiver 300 is illustrated in FIG. 3. In such a second mode, the amplitude path of the complete architecture (as in FIG. 1) may be disabled, leaving enabled the phase path as shown in FIG. 3. The phase path, as in FIG. 1, may comprise an LNA 305; frequency division circuitry such as injection locked oscillator 310, amplitude limiter 315, and a frequency divider 320; a TDC 325; a digital subtractor 330; a digital integrator having a digital adder 335 and a register 340; a sampling register 345; a first CORDIC logic 350; a low pass filter 355: and a second CORDIC logic 360. These components may operate as discussed more fully above in relation to FIG. 1.

In some embodiments, in the exemplary second mode, receiver 300 may be receiving a constant envelope phase-modulated RF signal, such as a Bluetooth low energy (BLE) signal.

Figure 4:
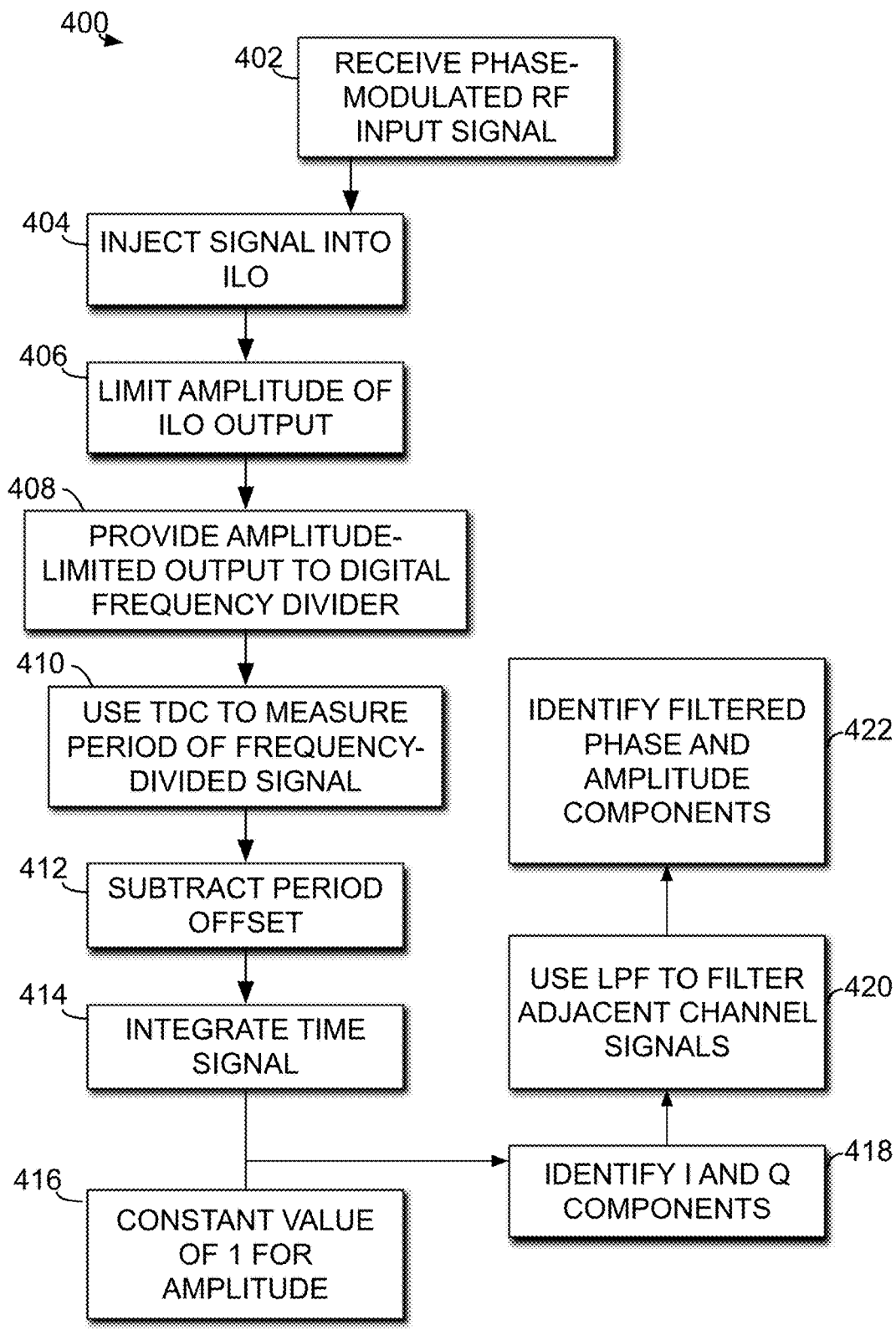
FIG. 4 is a flow chart illustrating a method performed by the configurable multi-mode receiver in some embodiments.

A flow diagram of an exemplary demodulation method 400 using the phase path of FIG. 3 is shown in FIG. 4. In step 402, the configurable receiver receives a modulated radio-frequency input signal. The frequency of the modulated radio-frequency input signal is divided as follows. In step 404, the modulated radio-frequency input signal is injected into an injection locked oscillator. The amplitude of the output of the injection-locked oscillator is limited in step 406 by providing the output of the injection-locked oscillator to an amplitude limiter. The amplitude-limited output of the injection-locked oscillator is provided in step 408 to a digital frequency divider to generate a frequency-divided signal.

In step 410, the frequency-divided signal is provided to a time-to-digital converter, which generates a digital time output representing a period of the frequency-divided signal. The time-to-digital converter used may be a self-triggered Vernier time-to-digital converter. In step 412 a period offset is subtracted from the digital time output to generate an offset digital time output. In step 414, the offset digital time output is integrated to generate an integrated time signal. The integrated time signal provides a digital representation of the phase of the radio-frequency input signal.

In addition to the steps used to determine the phase of the radio-frequency input signal, a constant value 416 may be set for the amplitude component of the input signal.

In some embodiments, based on digital signals representing the phase and amplitude (where the amplitude signal is a preset and constant value, such as 1) of the radio-frequency input signal, the configurable receiver operates in step 418 using CORDIC logic to identify in-phase (I) and quadrature (Q) components of a quadrature amplitude modulation (QAM) symbol. After conversion, the I and Q components may be filtered through a low pass filter 420, to remove noise from signals on adjacent channels or other jamming signals. After such filtering, the filtered I and Q components may be operated on by a second CORDIC logic 422 to revert the filtered I and Q components to filtered amplitude and phase digital signals. After this conversion, the filtered amplitude signal may be discarded, as all useful information is contained in the phase signal. The filtered phase signal may be passed to a baseband for demodulation directly from the phase signal.

Figure 5:
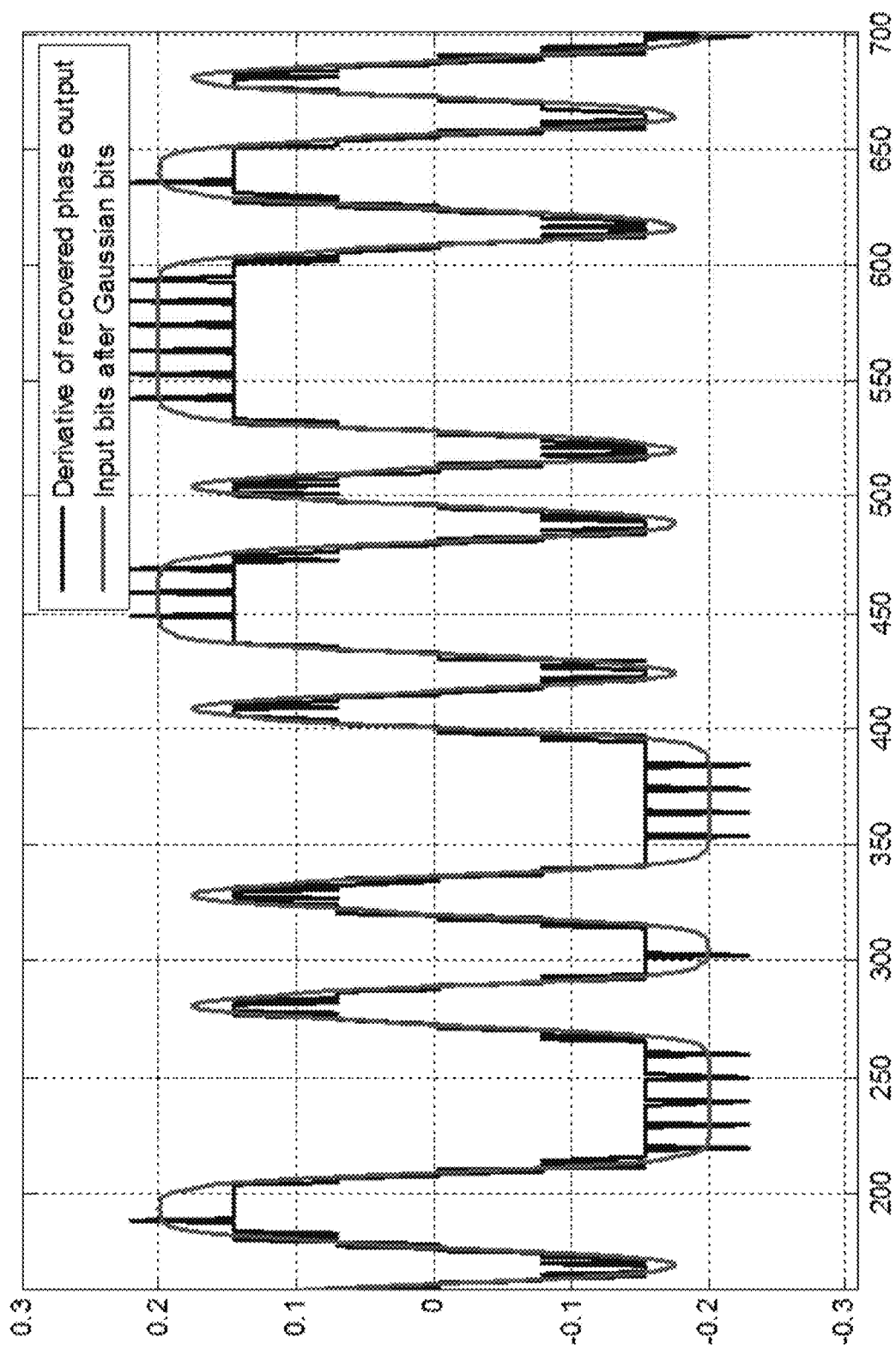
FIG. 5 depicts exemplary results using the configurable receiver of FIG. 1 in one embodiment, for an ideal scenario.

Exemplary experimental results for the phase path only mode of the configurable receiver, in the case of no jamming signal (e.g., without CORDICs 350, 360 or LPF 355, shown in FIG. 3, because a constant envelope is assumed), are shown in FIG. 5. As can be seen, the information can readily be recovered from a modulated signal to detect the encoded bits. There is no substantive performance degradation from this scenario with the absence of the amplitude path. In this embodiment, information may be recovered by performing a derivative on the baseband phase signal provided by the phase path of the architecture of FIG. 3.

However, in the presence of interference, the elimination of the amplitude information may in some cases degrade the linearity of the system. This is due to the fact that the sum of two constant envelope signals at different frequencies is not necessarily a constant envelope.

Figure 6A:
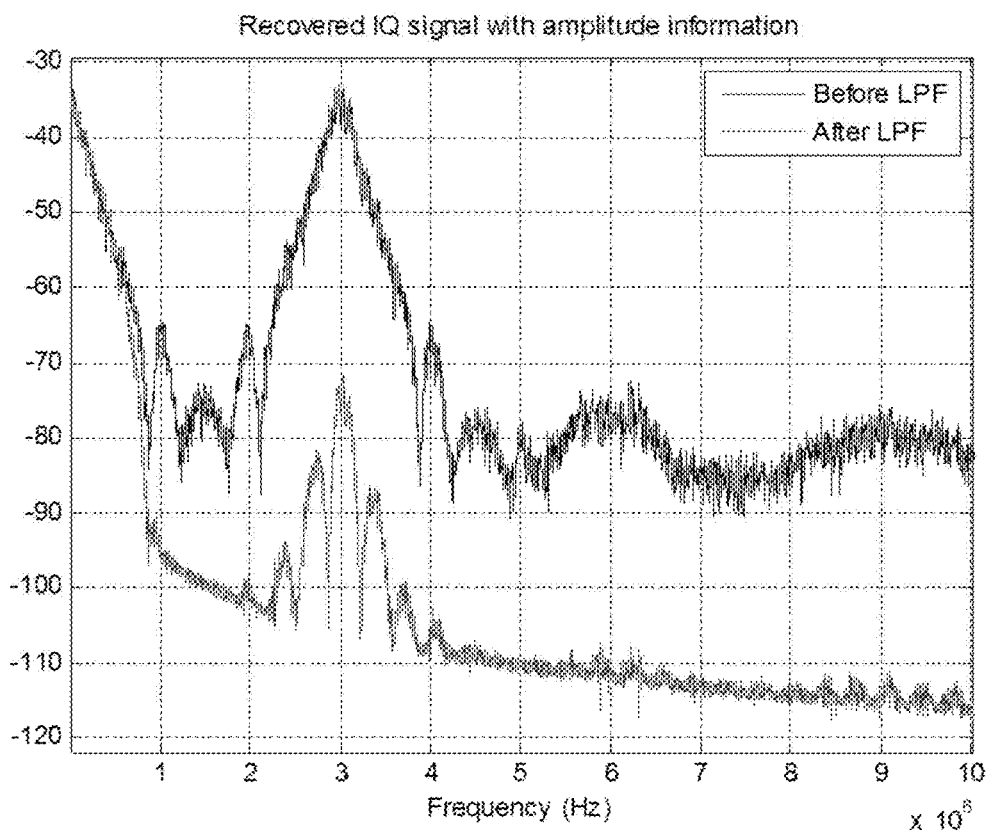
FIG. 6A depicts exemplary results using the configurable receiver of FIG. 1 in one embodiment, in the presence of a jamming signal.
Figure 6B:
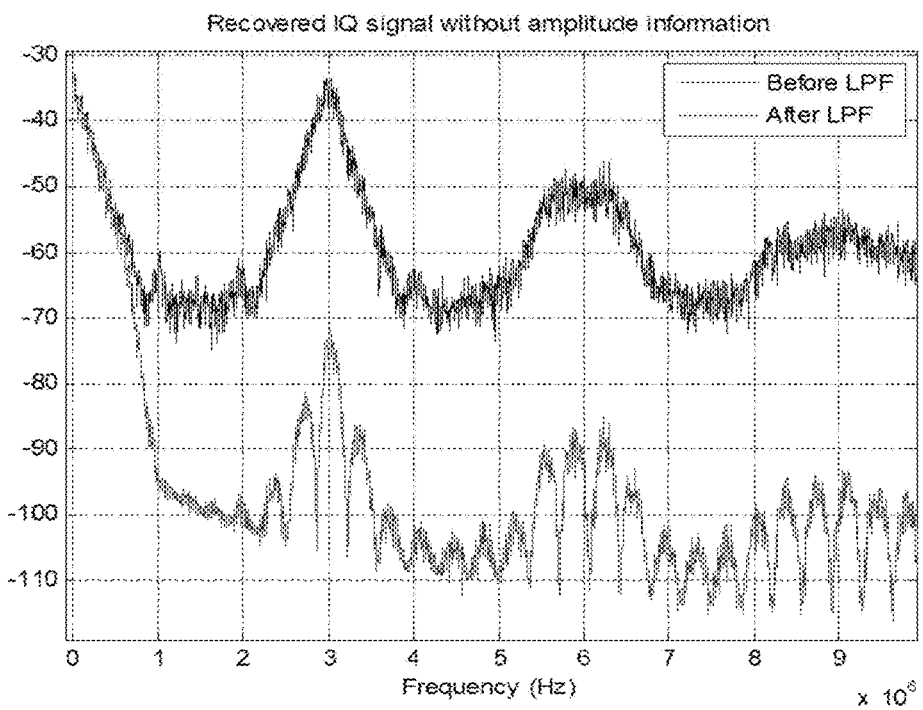
FIG. 6B depicts exemplary results using the configurable receiver in a second mode as in FIG. 3, in the presence of a jamming signal.

Referring now to FIGS. 6A-B, graphs represent the difference between recovering the signal with and without amplitude signal. FIG. 6A represents a recovered IQ signal with amplitude information. FIG. 6B represents a recovered IQ signal without amplitude information. Even though the linearity is affected, it has been shown in exemplary experimental simulation that with a filter in the IQ domain the desired signal is conserved in both scenarios. For interference scenarios, the most critical one is the 3 MHz specification (the highest power one), which is easily preserved in the preselected amplitude of 1 methodology herein disclosed.

FIG. 6A illustrates results for experimental setups that calculate the amplitude information (e.g., using the architecture of FIG. 1), with plotted data shown both before and after filtering with an LPF. FIG. 6B illustrates experimental results for processed signals using only the phase path and a preset amplitude input for the CORDIC (e.g., using configurable receiver 300 shown in FIG. 3), with plotted data shown both before and after filtering with an LPF. Without the amplitude information, as seen in FIG. 6B, the replicas that are created are higher frequencies (here, comparable signal and jammer power is shown because this effect is more severe in that case). However, the lower frequency information is preserved and after the LPF the signal can be recovered even without the amplitude. As such, in the case of the constant envelope signals of Bluetooth low energy, the phase path only mode represented by configurable receiver 300 may operate so as to reduce power consumption compared to utilizing the complete architecture, even in the presence of a jamming signal on an adjacent channel.

In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately". "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. As will be appreciated by those of skill in the art, embodiments of the configurable multi-mode receiver can include the receiver as part of a system including a processor or processing device and a memory coupled to the processor. For example, any system operable to receive Bluetooth signals and non-Bluetooth signals would benefit from the configurable receiver in accordance with embodiments disclosed herein.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for a configurable receiver comprising:
   receiving a radio frequency signal at the configurable receiver;
   generating a frequency-divided output signal from the radio frequency signal;
   identifying a period of the frequency-divided output signal;
   generating an offset digital time signal, the offset digital time signal operable to identify a shift in phase of the frequency-divided output signal by identifying a temporary change in the period of the frequency-divided output signal;
   integrating the offset digital time signal to provide a value representing a phase of the radio frequency signal;
   providing the value representing the phase of the radio frequency signal to a coordinate rotation digital computer (CORDIC) logic circuit;
   in a first mode, providing an amplitude signal of the radio frequency signal to the CORDIC logic circuit;
   entering a second mode responsive to an indication; and
   in the second mode, providing a predetermined constant value in lieu of the amplitude signal to the CORDIC logic circuit.

2. The method of claim 1, wherein providing the amplitude signal to the CORDIC logic circuit comprises:
   in the first mode, generating, by an amplitude detection circuit, the amplitude signal from the radio frequency signal and providing, by the amplitude detection circuit to the CORDIC logic circuit.

3. The method of claim 1, wherein entering the second mode responsive to the indication comprises:
   receiving, at a mode control circuit, the indication to enter the second mode; and
   in the second mode, turning off an amplitude path responsive to the indication.

4. The method of claim 1, wherein entering the second mode responsive to the indication and providing the predetermined constant value comprises:
   receiving, at a mode control circuit, an indication to disable an amplitude detection circuit; and
   responsively to the indication, disabling the amplitude detection circuit and providing the predetermined constant value to the CORDIC logic circuit.

5. The method of claim 1 further comprising:
   filtering an output of the CORDIC logic circuit to generate filtered in-phase (I) and quadrature (Q) components of the radio frequency signal; and
   providing the filtered I and Q components of the radio frequency signal to a second CORDIC logic circuit to generate a baseband phase signal.

6. The method of claim 1 further comprising:
   operating the configurable receiver in the second mode as a function of a determination that the radio frequency signal is a constant envelope modulated signal.

7. The method of claim 1 wherein the second mode is a Bluetooth low energy (BLE) mode.

8. The method of claim 1 wherein the indication is a Bluetooth low energy (BLE) indication and the predetermined constant value is a constant value of 1.

9. The configurable receiver of claim 1, wherein the CORDIC logic circuit is coupled to the digital integrator and coupled to receive the amplitude signal, the CORDIC logic circuit to generate in-phase (I) and quadrature (Q) components of the radio frequency signal.

10. The configurable receiver of claim 9, further comprising:
    a low pass filter coupled to the CORDIC logic circuit; and
    a second CORDIC logic circuit coupled to receive the filtered I and Q components of the radio frequency signal from the low pass filter and provide a baseband phase signal.

11. A configurable receiver configured to operate in a first mode and in a low power mode, the configurable receiver comprising:
    a phase detection circuit configured to receive a radio frequency signal and to determine a phase of the radio frequency signal;
    an amplitude detection circuit configured to, when the configurable receiver is operating in the first mode, receive the radio frequency signal and to determine an amplitude of the radio frequency signal;
    a mode control circuit coupled to the amplitude detection circuit and configured to, when the configurable receiver is operating in the low power mode, disable the amplitude detection circuit and to provide a predetermined constant value; and
    a coordinate rotation digital computer (CORDIC) logic circuit configured to receive the phase from the phase detection circuit, wherein the CORDIC logic circuit is configured to, when the configurable receiver is operating in the first mode, receive the amplitude from the amplitude detection circuit, and wherein the CORDIC logic circuit is configured to, when the configurable receiver is operating in the low power mode, receive, from the mode control circuit, the predetermined constant value in lieu of the amplitude,
    wherein the configurable receiver is configured to operate in the low power mode as a function of a determination that the radio frequency signal is a constant envelope modulated signal.

12. The configurable receiver of claim 11 wherein the mode control circuit is configured to receive an indication to selectively disable the amplitude detection circuit and to provide the predetermined constant value to the CORDIC logic circuit responsively to the indication.

13. The configurable receiver of claim 11 wherein the low power mode is a Bluetooth low energy (BLE) mode.

14. The configurable receiver of claim 11 wherein the predetermined constant value is "1".

15. The configurable receiver of claim 11, further comprising:
    a low pass filter coupled to the CORDIC logic circuit and configured to filter an output of the CORDIC logic circuit to generate filtered in-phase (I) and quadrature (Q) components of the radio frequency signal; and
    a second CORDIC logic circuit configured to receive the filtered I and Q components of the radio frequency signal from the low pass filter and to generate a baseband phase signal.

16. The configurable receiver of claim 11 wherein the radio frequency signal is one or more of a phase shift keying (PSK) signal, a quadrature amplitude modulation (QAM) signal, a frequency shift keying (FSK) signal, a binary frequency-shift keying (BFSK) signal, a multiple frequency-shift keying (MFSK) signal and a minimum-shift keying (MSK) signal.

17. The configurable receiver of claim 11 wherein the amplitude detection circuit comprises:
   an envelope detector coupled to receive the radio frequency signal and detect the amplitude of the radio frequency signal;
   an analog-to-digital circuit coupled to the envelope detector; and
   alignment logic coupled to the analog-to-digital circuit, the alignment logic configured to provide temporal alignment between the amplitude of the radio frequency signal and the phase of the radio frequency signal.

18. The configurable receiver of claim 11 wherein the phase detection circuit configured to receive the radio frequency signal and to determine the phase of the radio frequency signal comprises:
   a frequency division circuit configured to receive the radio frequency signal and to generate a frequency-divided output signal;
   a time-to-digital converter coupled to the frequency division circuit and configured to identify a period of the frequency-divided output signal;
   a digital subtractor coupled to the time-to-digital converter and configured to generate an offset digital time signal, the offset digital time signal operable to identify a shift in phase of the frequency-divided output signal by identifying a temporary change in the period of the frequency-divided output signal; and
   a digital integrator coupled to the digital subtractor to provide a value representing the phase of the radio frequency signal.

19. A system comprising:
   a configurable polar receiver configured to operate in at least a low power mode, comprising:
      a phase detection circuit configured to receive a radio frequency signal and to provide a value representing a phase of the radio frequency signal to a coordinate rotation digital computer (CORDIC) logic circuit;
      an amplitude detection circuit configured to receive the radio frequency signal and to generate an amplitude signal from the radio frequency signal; and
      a mode control circuit coupled to the amplitude detection circuit and to an input of the CORDIC logic circuit, the mode control circuit configured to receive an indication to selectively disable the amplitude detection circuit and to provide, when the configurable polar receiver is operating in the low power mode, a predetermined constant value to the CORDIC logic circuit in lieu of the amplitude signal from the amplitude detection circuit,
      wherein the configurable polar receiver is configured to operate in the low power mode as a function of a determination that the radio frequency signal is a constant envelope modulated signal.

20. The system of claim 19, further comprising:
   a processing device coupled to the configurable polar receiver; and
   a memory coupled to the processing device.

21. The configurable polar receiver of claim 19, further comprising:
   a low pass filter coupled to the CORDIC logic circuit and configured to filter an output of the CORDIC logic circuit to generate filtered in-phase (I) and quadrature (Q) components of the radio frequency signal; and
   a second CORDIC logic circuit configured to receive the filtered I and Q components of the radio frequency signal from the low pass filter and to generate a baseband phase signal.

22. A configurable receiver comprising:
   a frequency division circuit to receive a radio frequency signal and generate a frequency-divided output signal;
   a time-to-digital converter coupled to the frequency division circuit to identify a period of the frequency-divided output signal;
   a digital subtractor coupled to the time-to-digital converter to generate an offset digital time signal, the offset digital time signal operable to identify a shift in phase of the frequency-divided output signal by identifying a temporary change in the period of the frequency-divided output signal;
   a digital integrator coupled to the digital subtractor to provide a value representing a phase of the radio frequency signal;
   an amplitude detection circuit coupled to the frequency division circuit, the amplitude detection circuit coupled to receive the radio frequency signal and generate an amplitude signal representing an amplitude of the radio frequency signal; and
   a mode control circuit coupled to the amplitude detection circuit and to an input of a coordinate rotation digital computer (CORDIC) logic circuit, the mode control circuit configured, in a low power mode of operation, to receive an indication to disable the amplitude detection circuit and to provide a predetermined constant value to the CORDIC logic circuit in lieu of the amplitude signal from the amplitude detection circuit.

23. The configurable receiver of claim 22, further comprising a register operable to sample the value representing the phase of the radio frequency signal and provide a sampled signal to the CORDIC logic circuit.

24. The configurable receiver of claim 22 wherein the amplitude detection circuit comprises:
   an envelope detector coupled to receive the radio frequency signal and detect an amplitude of the radio frequency signal;
   an analog-to-digital circuit coupled to the envelope detector; and
   alignment logic coupled to the analog-to-digital circuit, the alignment logic configured to provide temporal alignment between the amplitude of the radio frequency signal and the phase of the radio frequency signal.

25. The configurable receiver of claim 22 wherein the indication to selectively disable the amplitude detection circuit is a Bluetooth low energy (BLE) indication to provide a constant value of 1 as the predetermined constant value provided in lieu of the amplitude signal from the amplitude detection circuit.

26. The configurable receiver of claim 22 wherein the configurable receiver is configured to operate in the low power mode of operation as a function of a determination that the radio frequency signal is a constant envelope modulated signal.

* * * * *